United States Patent
Shin

(10) Patent No.: US 11,999,190 B2
(45) Date of Patent: Jun. 4, 2024

(54) IN-WHEEL DRIVING DEVICE AND VEHICLE INCLUDING THE SAME

(71) Applicant: HYUNDAI MOBIS CO., LTD., Seoul (KR)

(72) Inventor: Kyeong Ho Shin, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 686 days.

(21) Appl. No.: 17/124,267

(22) Filed: Dec. 16, 2020

(65) Prior Publication Data

US 2022/0016928 A1    Jan. 20, 2022

(30) Foreign Application Priority Data

Jul. 14, 2020   (KR) ........................ 10-2020-0087024

(51) Int. Cl.
*B60B 27/00*      (2006.01)
*B60K 7/00*      (2006.01)
*G01P 1/02*      (2006.01)

(52) U.S. Cl.
CPC ........ *B60B 27/0068* (2013.01); *B60K 7/0007* (2013.01); *G01P 1/026* (2013.01); *B60B 27/0047* (2013.01); *B60B 2380/10* (2013.01); *B60B 2900/113* (2013.01); *B60B 2900/114* (2013.01); *B60B 2900/115* (2013.01);
(Continued)

(58) Field of Classification Search
CPC ............ B60B 27/0047; B60B 27/0068; B60B 27/0094; B60B 2380/10; B60B 2900/114; B60K 7/0007; B60K 2007/0092; G01P 1/026
See application file for complete search history.

(56) References Cited

U.S. PATENT DOCUMENTS

2003/0093188 A1*   5/2003   Morita ................. B60C 23/0408
                                                             701/1
2006/0045406 A1*   3/2006   Iwamoto ................. G01B 7/144
                                                             324/207.2
(Continued)

FOREIGN PATENT DOCUMENTS

DE          19907959 A1    9/1999
JP        2004-232795 A    8/2004
(Continued)

OTHER PUBLICATIONS

Office Action issued in corresponding Korean Patent Application No. 10-2020-0087024 dated Dec. 3, 2021, with English translation.
(Continued)

*Primary Examiner* — S. Joseph Morano
*Assistant Examiner* — Emily G. Castonguay
(74) *Attorney, Agent, or Firm* — MORGAN, LEWIS & BOCKIUS LLP

(57) ABSTRACT

Provided are an in-wheel driving device and a vehicle including the same. According to exemplary embodiments of the present disclosure, the in-wheel driving device includes: a wheel bearing including a hub forming a body; a resolver sensor provided in the inside of the wheel bearing, and including a resolver rotor and a resolver stator; and a wheel sensor partially provided in the inside of the wheel bearing, and detecting a rotation of the resolver rotor.

12 Claims, 4 Drawing Sheets

(52) U.S. Cl.
CPC ... *B60B 2900/311* (2013.01); *B60B 2900/321* (2013.01); *B60K 2007/0092* (2013.01)

(56) References Cited

U.S. PATENT DOCUMENTS

| | | | | |
|---|---|---|---|---|
| 2006/0087315 A1* | 4/2006 | Inoue | ............... | F16C 41/007 |
| | | | | 324/207.25 |
| 2009/0315544 A1* | 12/2009 | Takahashi | ............... | G01P 3/446 |
| | | | | 702/155 |
| 2010/0162831 A1* | 7/2010 | Kubokawa | ......... | G01D 5/24442 |
| | | | | 29/854 |
| 2012/0330490 A1* | 12/2012 | Ozaki | ............... | H02P 29/0241 |
| | | | | 701/22 |
| 2013/0073162 A1* | 3/2013 | Kim | ............... | B60T 8/329 |
| | | | | 903/902 |
| 2018/0126782 A1* | 5/2018 | Sinka | ............... | B60B 27/001 |
| 2019/0248225 A1 | 8/2019 | Kawamura et al. | | |
| 2020/0198456 A1* | 6/2020 | Kawamura | ............... | B60K 7/00 |

FOREIGN PATENT DOCUMENTS

| | | |
|---|---|---|
| JP | 2019-205241 A | 11/2019 |
| KR | 10-2017-0006431 A | 1/2017 |

OTHER PUBLICATIONS

Office Action issued in corresponding German Patent Application No. 10 2020 134 799.5 dated Mar. 7, 2024.

\* cited by examiner

IN-WHEEL DRIVING DEVICE AND VEHICLE INCLUDING THE SAME

CROSS-REFERENCE TO RELATED APPLICATION

This application is based on and claims the benefit of priority to Korean Patent Application No. 10-2020-0087024, filed on Jul. 14, 2020, in the Korean Intellectual Property Office, the disclosure of which is incorporated herein in its entirety by reference.

TECHNICAL FIELD

The present disclosure relates to an in-wheel driving device and a vehicle including the same.

BACKGROUND

In order to solve problems such as environmental pollution caused by conventional internal combustion engines and unstable supply and demand of fuel due to internal and external political situations, research and production of electric vehicles that operate by driving a motor using electrical energy have actively been carried out. Such electric vehicles may be classified into pure electric vehicles that drive motors using batteries in which electrical energy is stored, solar electric vehicles that drive motors using photovoltaic cells, and fuel cell vehicles that drive motors using fuel cells.

The electric vehicle may use an in-wheel driving device having a structure in which a motor is mounted inside the wheel.

According to the related art, a wheel sensor for measuring a wheel speed of a vehicle and a resolver sensor for precise control of a motor mounted in an in-wheel driving device are separately mounted. Since the wheel sensor and the resolver sensor should be arranged as separate modules in separate spaces of the related art in-wheel driving device, the overall volume of the in-wheel driving device is increased and the configuration thereof is complex, and accordingly, the assemblability of the in-wheel driving device is also reduced.

SUMMARY

The present disclosure has been made to solve the above-mentioned problems occurring in the prior art while advantages achieved by the prior art are maintained intact.

An aspect of the present disclosure provides an in-wheel driving device and a vehicle including the same, capable of significantly reducing its overall volume by reducing a volume occupied by a wheel sensor and a resolver sensor, simplifying its configuration, and improving assemblability.

According to an aspect of the present disclosure, an in-wheel driving device may include: a wheel bearing including a hub forming a body; a resolver sensor provided in the inside of the wheel bearing, and including a resolver rotor and a resolver stator; and a wheel sensor partially provided in the inside of the wheel bearing, and detecting a rotation of the resolver rotor.

The wheel bearing may include an inner wheel coupled to an outer peripheral surface of the hub in a radial direction of the hub, and the resolver rotor may be fixed to the inner wheel or the hub.

The wheel bearing may further include: an outer wheel spaced apart outward from the inner wheel in the radial direction; a rolling element provided between the inner wheel and the outer wheel; and a wheel cap provided outside the hub in an axial direction of the hub, and coupled to the outer wheel, and the resolver sensor may be provided in the inside of the wheel cap.

The wheel sensor may be partially provided in the inside of the wheel cap.

The wheel cap may include: a first extension portion extending toward the outer wheel, and coupled to the outer wheel; and a second extension portion spaced apart inward from the first extension portion in the radial direction, and extending toward the inner wheel, and the resolver stator may be coupled to the second extension portion.

The resolver rotor may have a plurality of recesses formed along an outer peripheral surface of a body part forming a body of the resolver rotor, and the wheel sensor may measure a distance between the wheel sensor and the outer peripheral surface of the resolver rotor to detect the rotation of the resolver rotor.

The resolver rotor may have a plurality of holes formed along a main plane of a body part forming a body of the resolver rotor, and the wheel sensor may detect presence or absence of the holes in an area where the wheel sensor faces the main plane of the resolver rotor to detect the rotation of the resolver rotor.

The wheel sensor may be spaced apart from the outer peripheral surface of the resolver rotor in a radial direction of the resolver rotor.

The wheel sensor may be spaced apart from the main plane of the resolver rotor in an axial direction of the resolver rotor.

The wheel sensor may penetrate the first extension portion so that the wheel sensor may be partially provided in the inside of the wheel cap.

The first extension portion of the wheel cap may cover an outer peripheral surface of the outer wheel in the radial direction.

According to another aspect of the present disclosure, a vehicle may include an in-wheel driving device including: a wheel bearing including a hub forming a body; a resolver sensor provided in the inside of the wheel bearing, and including a resolver rotor and a resolver stator; and a wheel sensor partially provided in the inside of the wheel bearing, and detecting a rotation of the resolver rotor.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, an in-wheel driving device and a vehicle including the same according to exemplary embodiments of the present disclosure will be described in detail with reference to the accompanying drawings.

In-Wheel Driving Device

Figure 1:
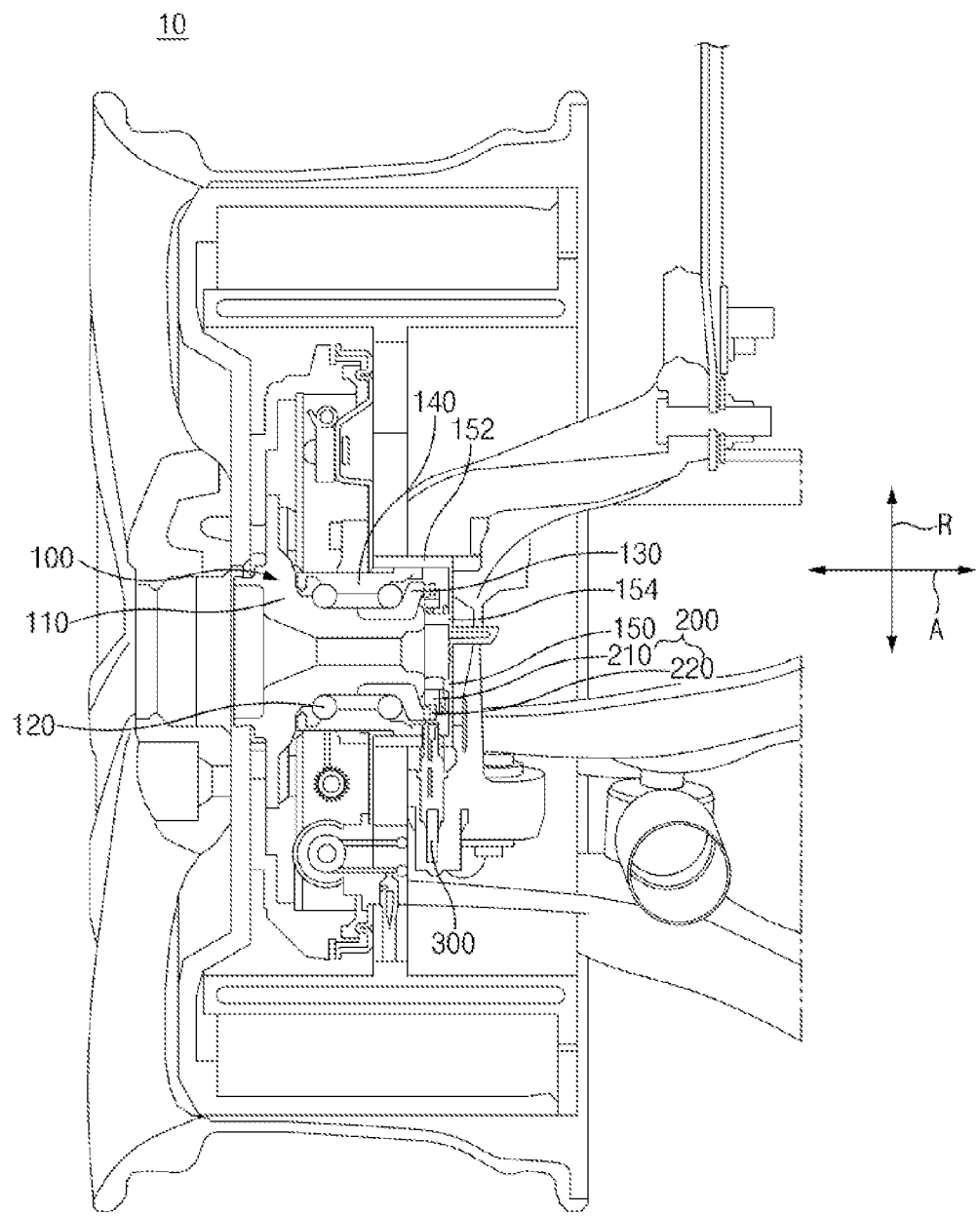
FIG. 1 illustrates a cross-sectional view of an in-wheel driving device according to an exemplary embodiment of the present disclosure.
Figure 2:
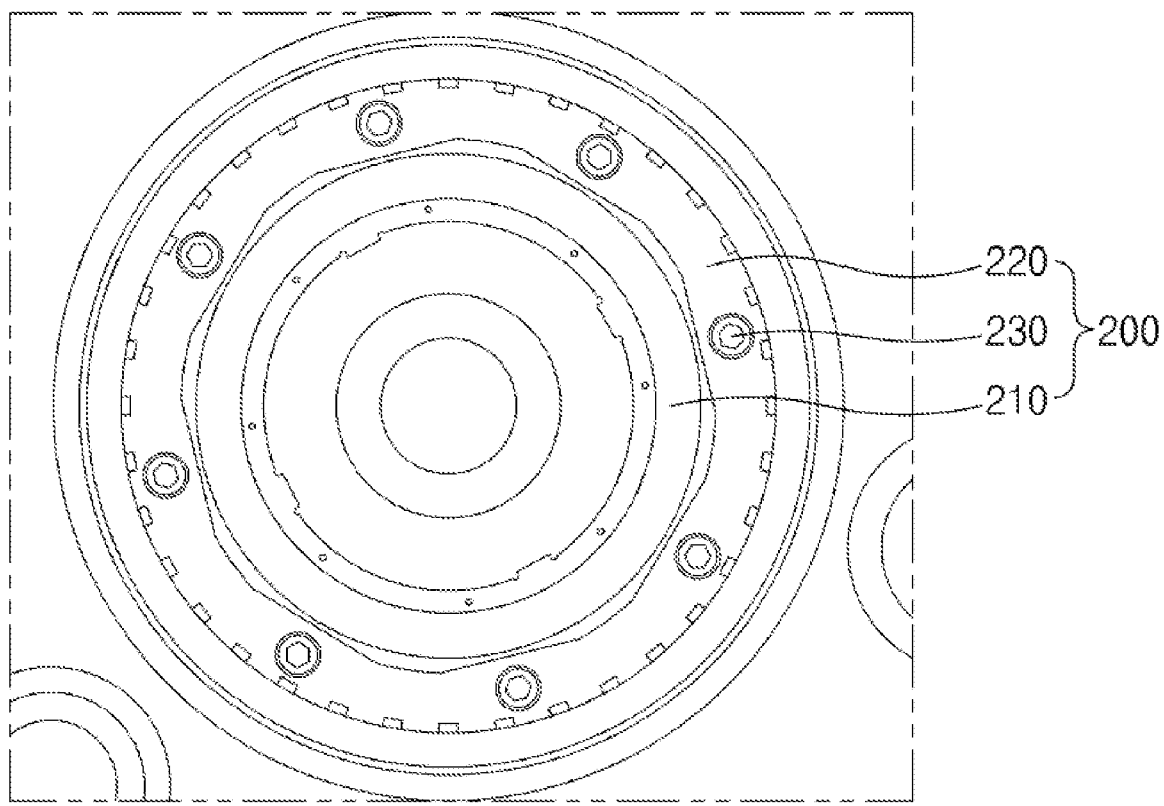
FIG. 2 illustrates an enlarged side view of a resolver sensor in an in-wheel driving device according to an exemplary embodiment of the present disclosure.

FIG. 1 illustrates a cross-sectional view of an in-wheel driving device according to an exemplary embodiment of the present disclosure, and FIG. 2 illustrates an enlarged side view of a resolver sensor in an in-wheel driving device according to an exemplary embodiment of the present disclosure.

As illustrated in FIGS. 1 and 2, an in-wheel driving device 10 according to an exemplary embodiment of the present disclosure may include a wheel bearing 100. When a vehicle equipped with the in-wheel driving device 10 is driven, the wheel bearing 100 may allow a vehicle wheel to rotate smoothly, support the weight of the vehicle, and reduce friction generated on the vehicle wheel.

The wheel bearing 100 may include a hub 110 forming a body of the wheel bearing 100. Here, the hub 110 forming the body of the wheel bearing 100 may occupy the largest volume in the wheel bearing 100 of the in-wheel driving device 10 according to an exemplary embodiment of the present disclosure.

Meanwhile, the in-wheel driving device 10 according to an exemplary embodiment of the present disclosure may include a resolver sensor 200. The resolver sensor 200 may control the driving of a motor mounted in the in-wheel driving device 10. That is, the resolver sensor 200 may detect a movement of the motor and send a signal to the outside. In particular, the resolver sensor may have high mechanical strength and excellent durability compared to an encoder.

The wheel bearing 100 may include an inner wheel 130 coupled to an outer peripheral surface of the hub 110 in a radial direction R of the hub 110, an outer wheel 140 spaced apart outward from the inner wheel 130 in the radial direction R, and a rolling element 120 provided between the inner wheel 130 and the outer wheel 140. FIG. 1 illustrates two rolling elements 120 spaced apart from each other in an axial direction of the hub 110. Meanwhile, the outer wheel 140 may be a unitary one-piece structure as illustrated in FIG. 1, or the outer wheel 140 may be a combination of a plurality of separate components.

As illustrated in FIGS. 1 and 2, the resolver sensor 200 may include a resolver stator 210 and a resolver rotor 220. The resolver rotor 220 may have a primary winding attached thereto, and the resolver stator 210 may have a secondary winding attached thereto. Since the operating principle of the resolver sensor including the resolver rotor and the resolver stator according to an exemplary embodiment of the present disclosure is the same as that of a conventionally well-known resolver sensor, a detailed description thereof will be omitted.

In addition, as illustrated in FIG. 1, the in-wheel driving device 10 according to an exemplary embodiment of the present disclosure may further include a wheel sensor 300 detecting the rotation of the resolver rotor 220. The wheel sensor 300 may measure a wheel speed of the vehicle equipped with the in-wheel driving device. The wheel sensor 300 according to an exemplary embodiment of the present disclosure may measure the rotation speed of the resolver rotor 220, thereby measuring the wheel speed of the vehicle to be described below.

Meanwhile, the resolver sensor 200 in the in-wheel driving device 10 according to an exemplary embodiment of the present disclosure may be at least partially provided in the inside of the wheel bearing 100. More preferably, the resolver rotor 220 and the resolver stator 210 constituting the resolver sensor 200 may be provided in the inside of the wheel bearing 100.

In addition, the wheel sensor 300 in the in-wheel driving device 10 according to an exemplary embodiment of the present disclosure may be partially provided in the inside of the wheel bearing 100.

According to an exemplary embodiment of the present disclosure, since the resolver sensor and the wheel sensor, which have separately been mounted outside a wheel bearing in an in-wheel driving device according to the related art, are at least partially mounted in the inside of the wheel bearing 100, a volume of the in-wheel driving device 10 may be reduced, and essential components required to manufacture the in-wheel driving device 10 may be reduced. In particular, according to an exemplary embodiment of the present disclosure, by removing a conventional tone wheel and allowing the resolver rotor 220 to serve as the tone wheel in order to measure the wheel speed, the resolver sensor and the wheel sensor, which have operated separately in the related art in-wheel driving device, may be integrated.

According to an exemplary embodiment of the present disclosure, the resolver rotor 220 may be fixed to the inner wheel 130 or the hub 110.

When the motor is driven, the inner wheel 130 and the hub 110 may rotate, and a rotational force thereof may be transferred to the wheel. That is, the wheel speed may be determined depending on the rotation speed of the inner wheel 130 or the hub 110. When the resolver rotor 220 is fixed to the inner wheel 130 or the hub 110, the resolver rotor 220 may also rotate with the rotation of the inner wheel 130 or the hub 110. Thus, the wheel sensor 300 according to an exemplary embodiment of the present disclosure may measure the rotation speed of the resolver rotor 220 fixed to the inner wheel 130 or the hub 110, thereby measuring the wheel speed of the vehicle.

Referring to FIG. 1, the in-wheel driving device 10 according to an exemplary embodiment of the present disclosure may further include a wheel cap 150 provided outside the hub 110 in the axial direction A of hub 110 and coupled to the outer wheel 140.

Meanwhile, the wheel cap 150 may include a first extension portion 152 extending toward the outer wheel 140 and coupled to the outer wheel 140, and a second extension portion 154 spaced apart inward from the first extension portion 152 in the radial direction R and extending toward the inner wheel 130 as illustrated in FIG. 1.

Here, an empty inner space may be formed between the first extension portion 152 and the second extension portion 154. According to an exemplary embodiment of the present disclosure, the resolver sensor 200 may be provided in the inside (that is, the aforementioned space) of the wheel cap 150, and the wheel sensor 300 may be at least partially provided in the inside of the wheel cap 150. As illustrated in FIG. 1, the entirety of the resolver sensor 200 may be provided in the inside of the wheel cap 150, and part of the wheel sensor 300 may be provided in the inside of the wheel cap 150.

Referring to FIG. 1, the resolver stator 210 in the in-wheel driving device 10 according to an exemplary embodiment of the present disclosure may be coupled to the second extension portion 154. Considering that the wheel cap 150 is coupled to the outer wheel 140 as described above, when the resolver stator 210 is coupled to the second extension portion 154, the resolver stator 210 and the outer wheel 140 may be connected to each other by the wheel cap 150.

Meanwhile, the first extension portion 152 of the wheel cap 150 may cover an outer peripheral surface of the outer wheel 140 in the radial direction R. In addition, as illustrated in FIG. 1, the wheel sensor 300 may penetrate the first extension portion 152. That is, according to an exemplary embodiment of the present disclosure, as the wheel sensor 300 penetrates the first extension portion 152, the wheel sensor 300 may be partially provided in the inside of the wheel cap 150.

Meanwhile, in the resolver sensor 200 as illustrated in FIG. 2, the resolver stator 210 may be provided inward from the resolver rotor 220. The resolver sensor 200 may further include a fixing portion 230 passing through the resolver rotor 220. When the resolver rotor 220 is fixed to the inner wheel 130 or the hub 110 as described above, the resolver rotor 220 may be fixed to the inner wheel 130 or the hub 110 through the fixing portion 230. For example, the fixing portion 230 may be a bolt.

Figure 3:
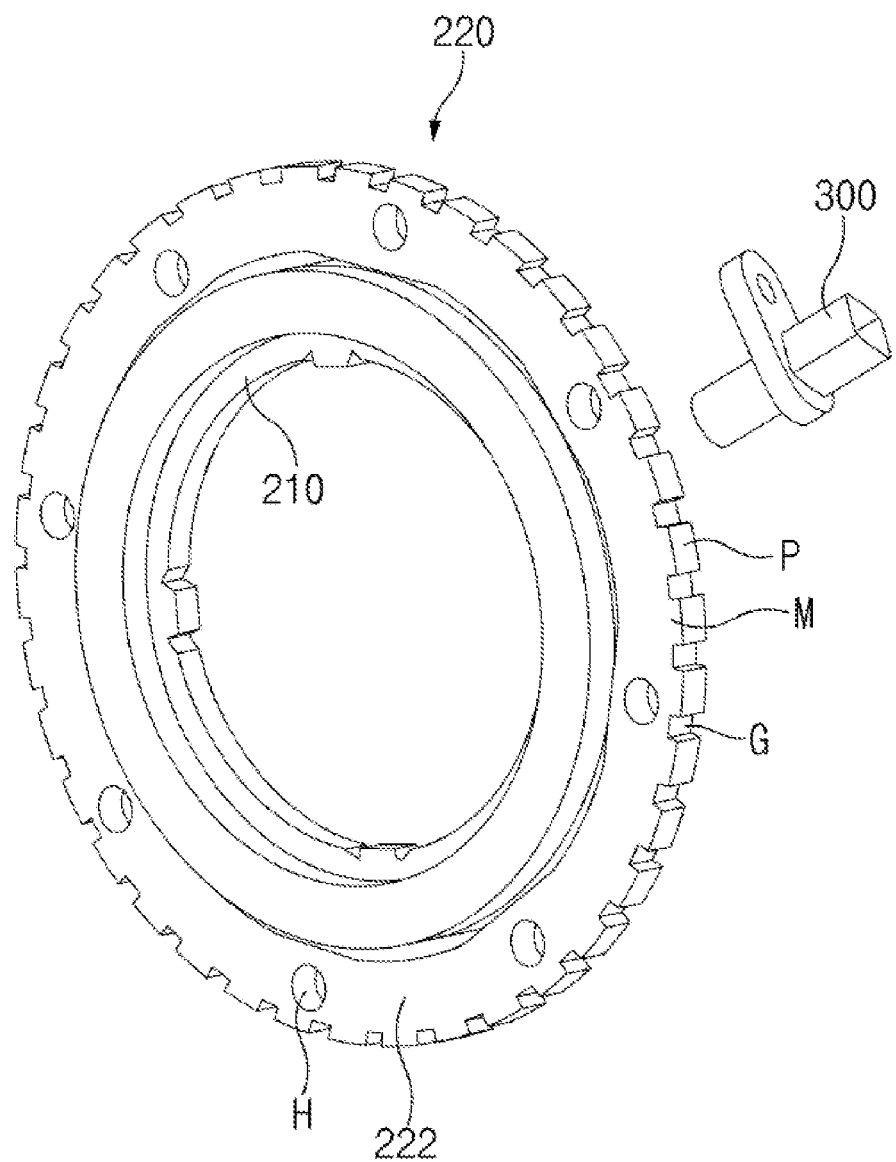
FIG. 3 illustrates a perspective view of a resolver sensor and a wheel sensor in an in-wheel driving device according to an exemplary embodiment of the present disclosure.
Figure 4:
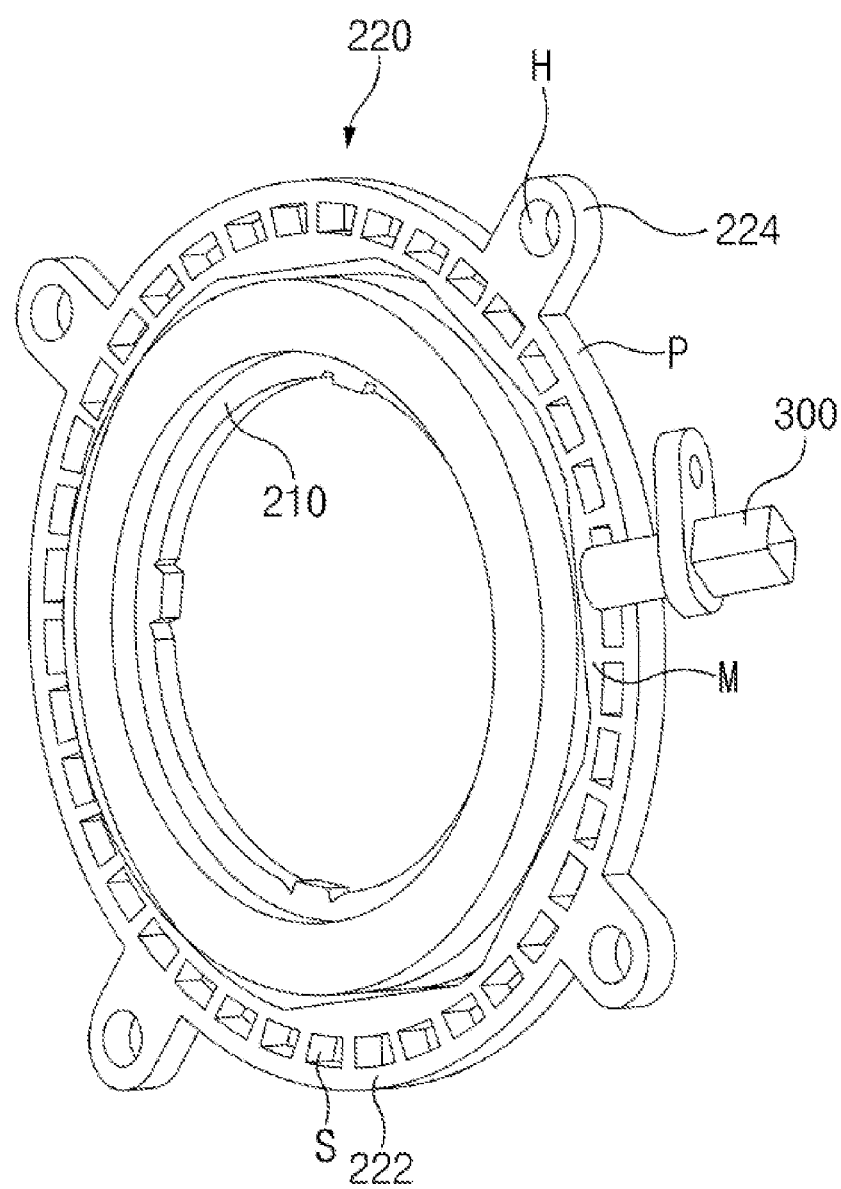
FIG. 4 illustrates a perspective view of a resolver sensor and a wheel sensor in an in-wheel driving device according to another exemplary embodiment of the present disclosure.

FIG. 3 illustrates a perspective view of a resolver sensor and a wheel sensor in an in-wheel driving device according to an exemplary embodiment of the present disclosure, and FIG. 4 illustrates a perspective view of a resolver sensor and a wheel sensor in an in-wheel driving device according to another exemplary embodiment of the present disclosure.

According to an exemplary embodiment illustrated in FIG. 3, the resolver rotor 220 may have a plurality of recesses G formed along an outer peripheral surface P of a body part 222 forming a body of the resolver rotor 220. Thus, the outer peripheral surface P of the resolver rotor 220 may have an uneven structure due to the plurality of recesses G. That is, portions of the outer peripheral surface P of the resolver rotor 220 in which the recesses G are formed may be relatively concave, and portions of the outer peripheral surface P of the resolver rotor 220 in which the recesses G are not formed may be relatively convex. More preferably, the plurality of recesses G may be spaced equidistant from each other. Here, the outer peripheral surface P refers to a surface of the resolver rotor 220 facing outward in the radial direction of the resolver rotor 220.

According to an exemplary embodiment of the present disclosure, a fixing hole H may be formed in the body part 222 of the resolver rotor 220. The fixing hole H may allow the fixing portion 230 (see FIG. 2) to pass through the resolver rotor 220 and be inserted into the inner wheel 130 (see FIG. 1).

In addition, according to an exemplary embodiment of the present disclosure, the wheel sensor 300 may be spaced apart from the outer peripheral surface P of the resolver rotor 220 in the radial direction of the resolver rotor 220. Thus, the wheel sensor 300 may measure a distance between the wheel sensor 300 and the outer peripheral surface P of the resolver rotor 220 to detect the rotation of the resolver rotor 220.

That is, according to an exemplary embodiment of the present disclosure, the plurality of recesses G may be formed on the outer peripheral surface P of the resolver rotor 220, and the wheel sensor 300 may measure the distance to the outer peripheral surface P of the resolver rotor 220 over time by using the plurality of recesses G, thereby measuring the rotation speed of the resolver rotor 220.

According to another exemplary embodiment illustrated in FIG. 4, the resolver rotor 220 may have a plurality of sensing holes S formed along a main plane M of the body part 222 forming the body of the resolver rotor 220. More preferably, the plurality of sensing holes S may be spaced equidistant from each other. Meanwhile, the main plane M refers to a flat surface of the resolver rotor 220 facing outward in the axial direction of the resolver rotor 220.

According to another exemplary embodiment of the present disclosure, the resolver rotor 220 may further include a projection portion 224 protruding from the body part 222 in the radial direction of the resolver rotor 220. FIG. 4 illustrates four projection portions 224 spaced equidistant. A fixing hole H may be formed in each projection portion 224. The fixing hole H may allow the fixing portion 230 (see FIG. 2) to pass through the resolver rotor 220 and be inserted into the inner wheel 130 (see FIG. 1).

In addition, according to another exemplary embodiment of the present disclosure, the wheel sensor 300 may be spaced apart from the main plane M of the resolver rotor 220 in the axial direction of the resolver rotor 220. Thus, the wheel sensor 300 may detect the presence or absence of the sensing holes S in an area where the wheel sensor 300 faces the main plane M of the resolver rotor 220 to detect the rotation of the resolver rotor 220.

Vehicle

A vehicle according to an exemplary embodiment of the present disclosure may include the in-wheel driving device 10. Since the configuration and features of the in-wheel driving device 10 are similar to or the same as those described above, a detailed description thereof will be omitted.

As set forth above, according to exemplary embodiments of the present disclosure, by reducing a volume occupied by the wheel sensor and the resolver sensor, the overall volume of the in-wheel driving device may be significantly reduced and the configuration thereof may be simplified, and thus assemblability may be improved.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An in-wheel driving device, comprising:
a wheel bearing including a hub forming a body;
a resolver sensor provided in an inside of the wheel bearing, and including a resolver rotor and a resolver stator;
a wheel sensor partially provided in the inside of the wheel bearing, and detecting a rotation of the resolver rotor; and
a wheel cap to which the resolver stator is directly coupled.

2. The in-wheel driving device according to claim 1, wherein the wheel bearing includes an inner wheel coupled to an outer peripheral surface of the hub in a radial direction of the hub, and the resolver rotor is fixed to the inner wheel or the hub.

3. The in-wheel driving device according to claim 2, wherein the wheel bearing further includes:
an outer wheel spaced apart outward from the inner wheel in the radial direction;
a rolling element provided between the inner wheel and the outer wheel; and
the wheel cap provided outside the hub in an axial direction of the hub, and coupled to the outer wheel, and the resolver sensor is provided in an inside of the wheel cap.

4. The in-wheel driving device according to claim 3, wherein the wheel sensor is partially provided in the inside of the wheel cap.

5. The in-wheel driving device according to claim 3, wherein the wheel cap includes: a first extension portion extending toward the outer wheel, and coupled to the outer wheel; and a second extension portion spaced apart inward from the first extension portion in the radial direction, and extending toward the inner wheel, and the resolver stator is coupled to the second extension portion.

6. The in-wheel driving device according to claim 1, wherein the resolver rotor has a plurality of recesses formed along an outer peripheral surface of a body part forming a body of the resolver rotor, and the wheel sensor measures a distance between the wheel sensor and the outer peripheral surface of the resolver rotor to detect the rotation of the resolver rotor.

7. The in-wheel driving device according to claim 1, wherein the resolver rotor has a plurality of holes formed along a main plane of a body part forming a body of the resolver rotor, and the wheel sensor detects presence or absence of the holes in an area where the wheel sensor faces the main plane of the resolver rotor to detect the rotation of the resolver rotor.

8. The in-wheel driving device according to claim 6, wherein the wheel sensor is spaced apart from the outer peripheral surface of the resolver rotor in a radial direction of the resolver rotor.

9. The in-wheel driving device according to claim 7, wherein the wheel sensor is spaced apart from the main plane of the resolver rotor in an axial direction of the resolver rotor.

10. The in-wheel driving device according to claim 5, wherein the wheel sensor penetrates the first extension portion so that the wheel sensor is partially provided in the inside of the wheel cap.

11. The in-wheel driving device according to claim 5, wherein the first extension portion of the wheel cap covers an outer peripheral surface of the outer wheel in the radial direction.

12. A vehicle comprising an in-wheel driving device, wherein the in-wheel driving device includes:
- a wheel bearing including a hub forming a body;
- a resolver sensor provided in an inside of the wheel bearing, and including a resolver rotor and a resolver stator;
- a wheel sensor partially provided in the inside of the wheel bearing, and detecting a rotation of the resolver rotor; and
- a wheel cap to which the resolver stator is directly coupled.

* * * * *